(12) United States Patent
Whitworth et al.

(10) Patent No.: US 9,885,786 B2
(45) Date of Patent: Feb. 6, 2018

(54) RETROSPECTIVE EPHEMERIS COLLECTION

(71) Applicant: Intel Corporation, Santa Clara, CA (US)

(72) Inventors: Gerald Whitworth, Northampton (GB); Rui Zuo, Northampton (GB)

(73) Assignee: INTEL CORPORATION, Santa Clara, CA (US)

( * ) Notice: Subject to any disclaimer, the term of this patent is extended or adjusted under 35 U.S.C. 154(b) by 113 days.

(21) Appl. No.: 14/273,741

(22) Filed: May 9, 2014

(65) Prior Publication Data

US 2015/0063342 A1    Mar. 5, 2015

Related U.S. Application Data

(60) Provisional application No. 61/821,889, filed on May 10, 2013.

(51) Int. Cl.
  *G01S 19/01*    (2010.01)
  *G01S 19/24*    (2010.01)
  *H04B 7/185*    (2006.01)
  *H04L 7/00*    (2006.01)

(52) U.S. Cl.
  CPC ............ *G01S 19/01* (2013.01); *G01S 19/243* (2013.01); *H04B 7/185* (2013.01); *H04L 7/0033* (2013.01)

(58) Field of Classification Search
  CPC ..... H04B 7/185; H04L 7/0033; H04L 7/0037; H04L 7/0041; H04L 7/0004; H04L 7/0079; H04L 7/0083; H04L 7/0087; G01S 19/01; G01S 19/13; G01S 19/23; G01S 19/235; G01S 19/258; G01S 19/39
  See application file for complete search history.

(56) References Cited

U.S. PATENT DOCUMENTS

| | | | |
|---|---|---|---|
| 2006/0126762 A1* | 6/2006 | Tapucu | G01S 19/243 375/340 |
| 2010/0079339 A1* | 4/2010 | Yoon | G01S 19/24 342/357.68 |
| 2011/0148697 A1* | 6/2011 | Thiel | G01S 19/34 342/357.26 |
| 2011/0291880 A1* | 12/2011 | Yang | G01S 19/243 342/357.21 |

* cited by examiner

*Primary Examiner* — Yemane Mesfin
*Assistant Examiner* — Peter Chen
(74) *Attorney, Agent, or Firm* — Viering, Jentschura & Partner mbB

(57) ABSTRACT

A method for collecting a satellite data stream is disclosed. The method includes: receiving satellite signals; storing the received satellite signals; completing bit synchronization and subframe synchronization of the received satellite signals; recovering a portion of the satellite data stream from the satellite signals stored prior to completing bit synchronization and subframe synchronization.

21 Claims, 8 Drawing Sheets

RETROSPECTIVE EPHEMERIS COLLECTION

RELATED APPLICATION

This is a non-provisional application based upon U.S. provisional patent application Ser. No. 61/821,889, entitled "RETROSPECTIVE EPHEMERIS COLLECTION", filed May 10, 2013, which is incorporated herein by reference.

TECHNICAL FIELD

The disclosure relates satellite data collection. In particular, methods and devices are provided for collecting a satellite data stream.

BACKGROUND

Global positioning devices, e.g., receivers, can receive signals from satellites in order to determine the position of the receiver. This can be useful to a user for a variety of reasons on both land and at sea. As technology has moved forward, a greater number of devices have the ability to receive and use satellite signals for determining position.

In Global Navigation Satellite System (GNSS) applications, the Ephemeris data for a satellite is used to calculate the satellites' position in orbit. The position of satellites is a fundamental requirement to generating a position and time solution in GNSS receivers. In all GNSS systems, the Ephemeris data is transmitted serially by the satellites. In situations where the Ephemeris data is not provided externally to the receiver system (such as via a data link) the receiver must collect the Ephemeris data before the corresponding measurements from the satellite can be used in the position and time solution.

The Ephemeris data collection is a serial process. For Global Positioning System (GPS) satellites, the Ephemeris (and Clock) information are transmitted in three subframes, where each subframe consists of ten, thirty bit, parity checked words. A further two subframes, containing GPS system data, complete five subframes, whereupon the Ephemeris and Clock data are repeated. The five subframe sequence takes 30 seconds to complete. Each subframe is six seconds in duration, and individual data bits have a period of 20 milliseconds.

An example of the 5 subframe Global Positioning System (GPS) data structure 100, as transmitted by GPS satellites, is shown in FIG. 1. A data structure 100 contains 5 subframes, each of the subframes has a duration of 6 seconds. Each subframe is composed of 10 words, while each word has a duration of 0.6 seconds, with a length of 30 bits. The Clock and Ephemeris data, required to compute the satellite's position, are contained in the data words (words 3-10) of subframes 1-3. Subframes 4 and 5 contain GPS system information, including status and approximate orbit parameters for all the other satellites in the constellation. Hence, in order for the satellite position to be calculated, the data words (3-10) of subframes 1, 2 and 3 is collected by the receiver, together with a reference time from the truncated Time-Of-Week in the word 1, which is also named as Telemetry word (TLM). Note that word 1 (TLM) and word 2 (Handover Word (HOW)) are common to all subframes and are shown in FIGS. 2 and 3, respectively.

As illustrated in FIG. 2, a TLM word (word 1) has a 30-bit sequence structure 200. The TLM word structure 200 starts with a preamble sequence. The preamble sequence is a string of 8 bits. In one or more embodiments, the preamble sequence is always 10001011 (represented in hexadecimal as 0x8B). The TLM word structure 200 further contains a TLM message sequence which has a length of 14 bits, and a parity sequence which has a length of 6 bits. The TLM word structure 200 also contains 2 bits for reserved services/data.

As illustrated in FIG. 3, a HOW word (word 2) has a 30-bit sequence structure 300. The HOW word structure 300 contains a truncated Time-Of-Week Count sequence which has a length of 17 bits, a Flag Bits sequence which has a length of 2 bits, a S/F ID sequence which has a length of 3 bits, a Parity preserving Bits sequence which has a length of 2 bits, and a parity sequence which has a length of 6 bits.

GPS receivers undergo a complicated procedure to collect and demodulate the satellite data. Because the pseudo random noise (PRN) code is of one millisecond duration, and the data bits are of twenty milliseconds duration, it is necessary to identify (without doubt), the millisecond containing the data bit edge. For strong signals this is relatively easy, but for weak signals, at the lower limit of when data demodulation is possible, this can take many bit edge transitions to achieve without any doubt of which millisecond contains the edge. This process to find the millisecond containing the bit edge can thus take many seconds to complete, especially when the data transmitted contains many consecutive ones or zeros, and hence very few data bit transitions. Because GPS satellites are at different locations in orbit, and thus at different distances from the receiver, the local receiver time millisecond containing the data bit transition can be different for each satellite.

Once the millisecond containing the data bit edge has been determined with 100% certainty (referred to as "achieving bit synchronization"), the receiver can then accumulate twenty millisecond complex time aligned data samples for each data bit and determine if the data bit is a "zero" or a "one". The next process is to determine the start of the subframe. All subframes start with the eight bit preamble sequence 10001011 (hexadecimal 0x8B). Although this has often been referred to as the "unique word", this is not the case and this 0x8B sequence of eight bits can occur frequently in the data stream. That is, it is also possible that other words in the subframe can also start with the sequence 0x8B. For example, there is a period in each week when the most significant bits of word 2 (the HOW word) are also 0x8B. Hence the start of the subframe cannot be determined by finding a sequence of 0x8B alone, even if all words pass parity.

Instead, to uniquely identify the start of a subframe with 100% certainty, the following checks are made: (1) Subframes must start with the 0x8B preamble sequence; (2) Subframes must contain 10 words, all of which pass the parity check; and (3) Two adjacent Subframes must be found and the difference between the truncated Time_of_Week (TOW) in the two TLM words must differ by six seconds. Only when all of the three checks just described pass, does the receiver know the start point of the data subframes, and the process of decoding the satellite data stream can commence.

So, using this method, the minimum time to collect the satellite Clock and Ephemeris data, contained in subframes 1-3, is 18 seconds. This is achieved only when bit synchronization and subframe synchronization are achieved just before the start of subframe 1 being received.

However, in practice, bit synchronization can be achieved at any point within the five subframe sequence. If bit synchronization is achieved mid-way through subframe 1 then the first subframe to be completely received is subframe 2. This is then followed by subframes 3, 4 and 5 before subframe 1 is repeated. Under these conditions it can take up to 36 seconds to completely receive the Clock and Ephemeris data contained in subframes 1-3. The time taken to collect Clock and Ephemeris data is thus between 18 and 36 seconds, plus the several seconds it takes to achieve bit synchronization, plus the "idle" time (illustrated as 460 in FIG. 4) waiting for the start of the next subframe to occur.

An example of this conventional method can be seen in FIG. 4 which shows an example of a conventional timeline 400 of satellite acquisition and Ephemeris collection with the completion of the Ephemeris collection 450 occurring after all of the subframes have been published. In time point 402, a satellite searching commences, e.g. when a GPS receiver is in a Cold Start condition. Once satellite acquisition is achieved in 404, a bit edge detection is performed. In time point 406, a bit edge is successfully detected, i.e. a bit synchronization is achieved. In one or more embodiments, a bit synchronization is achieved mid-way through subframe 1, which is the case illustrated in FIG. 4, then the subframe synchronization can be completed earliest after a start point of subframe 3 (which is illustrated as time point 408). I.e. the first complete received subframe is subframe 2, this is then followed by publishing subframe 3 at time point 410, publishing subframe 4 at time point 412, and publishing subframe 5 at time pint 414 successively. Then subframe 1 is repeated at time point 416, and consequently, a complete Ephemeris data which contains subframes 1 to 3 are collected. As the embodiment shown in FIG. 4, it may take up to 36 seconds to collect a complete Ephemeris data (illustrated as the hashes boxes).

Accordingly, it would be desirable to provide methods and systems which reduce the amount of time to collect Clock and Ephemeris data.

SUMMARY

According to an aspect of the present disclosure, a method for collecting a satellite data stream is disclosed. The method includes: receiving satellite signals; storing the received satellite signals; completing bit synchronization and subframe synchronization of the received satellite signals; recovering a portion of the satellite data stream from the satellite signals stored prior to completing bit synchronization and subframe synchronization.

In one or more embodiments, the satellite data stream may include at least Ephemeris data, e.g. the satellite data stream may include at least Clock and Ephemeris data.

In one or more embodiments, the satellite data stream may include a 5-subframe data sequence. Each subframe of the satellite data stream may contain ten words, wherein the first word of each subframe may start with a preamble bit sequence, and the second word of each subframe may start with a time-of-week bit sequence. For example, word 1 of each subframe may be a telemetry word (TLM), and word 2 of each subframe may be a handover word (HOW). Further, each TLM word may start with an 8-bit preamble sequence, and each HOW word may start with a truncated time-of-week (TOW) bit sequence.

In one or more embodiments, the satellite data stream may include a 5-subframe data sequence, and Clock and Ephemeris data may be contained in the first three subframes of the 5-subframe data sequence.

In some embodiments, receiving satellite signals may include receiving satellite signals from a satellite of a GNSS system, wherein the GNSS system is selected from one of GPS, GLONASS, Galileo, Beidou systems. In other embodiments, receiving satellite signals may include receiving satellite signals from multiple satellites, wherein the multiple satellites are satellites of one or more of GPS, GLONASS, Galileo, Beidou systems. Further, in some embodiments, the satellite signals received from multiple satellites may be stored separately.

In one or more embodiments, storing the received satellite signals may include storing raw complex data samples based on the received satellite signals, e.g. storing raw complex data samples demodulated from the received satellite signals. In one or more embodiments, storing the received satellite signals may include storing complex I and Q data samples.

In one or more embodiments, completing bit synchronization may include a determination of a data bit edge from the received satellite signals, e.g. a determination of a millisecond containing a data bit edge from the received satellite signals.

In one or more embodiments, completing subframe synchronization may include identifying a start point of a subframe. In one or more embodiments, identifying a start point of a subframe may include detecting a predefined preamble of a subframe, wherein the predefined preamble is an 8-bit preamble sequence, e.g. a hexadecimal 0x8B sequence. In one or more embodiments, identifying a start point of a subframe may include detecting a predefined preamble in a beginning of a subframe, e.g. detecting a predefined preamble in a TLM word of a subframe. In one or more embodiments, identifying a start point of a subframe may further include a determination of a parity check for each word, e.g. checking whether a number of words contained in the detected subframe is a predefined number, and performing a parity check for each word, wherein the predefined number of words contained in a subframe is ten words. In one or more embodiments, identifying a start point of a subframe may furthermore include detecting a second subframe adjacent to the first detected subframe, and identifying a time difference between the two adjacent subframes. In one or more embodiments, identifying a time difference between the two adjacent subframes may include checking whether a time difference between the two adjacent subframes is a predefined time period, e.g. identifying a time difference between truncated TOW in TLM words of the two adjacent subframes, e.g. checking whether a time difference between truncated TOW in TLM words of the two adjacent subframes is a predefined time period, wherein the predefined time period is 6 seconds.

In one or more embodiments, the method for collecting a satellite data stream may further include retrospectively reprocessing the stored satellite signals, e.g. retrospectively reprocessing raw complex data samples demodulated from the received satellite signals. In one or more embodiments, retrospectively reprocessing the raw complex data samples may include accumulating the raw complex data samples for each data bit, e.g. accumulating twenty millisecond complex data samples for each data bit.

In one or more embodiments, recovering a portion of the satellite data stream may include recovering a portion of the satellite data stream from raw complex data samples stored based on the received satellite signals prior to completing bit synchronization and subframe synchronization.

In one or more embodiments, the method for collecting a satellite data stream may further include publishing the portion of the satellite data stream, e.g. publishing at least one subframe of the satellite data stream upon completing subframe synchronization. In one or more embodiments, at least one subframe may be published upon identifying a start point of a subframe of the satellite data stream. In one or more embodiments, at least one subframe may be published upon detecting two successive preamble sequences in the satellite data stream.

In one or more embodiments, the method for collecting a satellite data stream may further include publishing at least one subframe upon completing subframe synchronization after a start point of a second subframe in the five-subframe data sequence. In one or more embodiments, the method for collecting a satellite data stream may further include publishing at least two subframes upon completing subframe synchronization after a start point of a third subframe in the five-subframe data sequence. In one or more embodiments, the method for collecting a satellite data stream may further include publishing at least three subframes upon completing subframe synchronization after a start point of a fourth subframe in the five-subframe data sequence.

According to another aspect of the present disclosure, a device for collecting a satellite data stream is disclosed. The device includes: a receiving unit configured to receive satellite signals; a storing unit configured to store the received satellite signals; and a processing unit configured to complete bit synchronization and subframe synchronization of the received satellite signals, and to recover a portion of the satellite data stream from the satellite signals stored in the storing unit prior to completing bit synchronization and subframe synchronization.

In one or more embodiments, the satellite data stream may include at least ephemeris data. In one or more examples, the satellite data stream may include at least clock and ephemeris data.

In one or more embodiments, the satellite data stream may include a 5-subframe data sequence. Each subframe of the satellite data stream will contain ten words, wherein the first word of each subframe may start with a preamble bit sequence, and the second word of each subframe may start with a time-of-week bit sequence, e.g. word 1 of each subframe may be a telemetry word (TLM), and word 2 of each subframe may be a handover word (HOW). each TLM word starts with an eight-bit preamble sequence, and each HOW word starts with a truncated time-of-week (TOW) bit sequence.

In one or more embodiments, the satellite data stream will include a five-subframe data sequence, and ephemeris data will be contained in the first three subframes of the five-subframe data sequence.

In some embodiments, the receiving unit may be configured to receive satellite signals from a satellite of a GNSS system, wherein the GNSS system is selected from one of GPS, GLONASS, Galileo, Beidou systems. In other embodiments, the receiving unit may be configured to receive satellite signals from multiple satellites, wherein the multiple satellites are satellites of one or more of GPS, GLONASS, Galileo, Beidou systems. In one or more embodiments, the storing unit may include multiple buffer storing units configured to store the satellite signals received from multiple satellites separately.

In one or more embodiments, the storing unit may be configured to store raw complex data samples based on the received satellite signals, e.g. the storing unit may be configured to store complex I and Q data samples.

In one or more embodiments, the processing unit may be further configured to demodulate the received satellite signals, and the storing unit may be configured to store raw complex data samples from the demodulated satellite signals.

In one or more embodiments, the processing unit may be further configured to determine a data bit edge from the received satellite signals to complete bit synchronization, e.g. by determining a millisecond containing a data bit edge from the received satellite signals to complete bit synchronization.

In one or more embodiments, the processing unit may be further configured to identify a start point of a subframe to complete subframe synchronization. In one or more embodiments, the processing unit may be further configured to detect a predefined preamble of a subframe to identify a start point of a subframe, wherein the predefined preamble is an 8-bit preamble sequence, e.g. a hexadecimal 0x8B sequence.

In one or more embodiments, the processing unit may be further configured to detect a predefined preamble in a beginning of a subframe to identify a start point of a subframe.

In one or more embodiments, the processing unit may be further configured to detect a predefined preamble in a TLM word of a subframe to identify a start point of a subframe.

In one or more embodiments, the processing unit may be further configured to determine a length of the detected subframe to identify a start point of a subframe.

In one or more embodiments, the processing unit may be further configured to determine a number of words contained in the detected subframe, and to perform a parity check for each word to identify a start point of a subframe.

In one or more embodiments, the processing unit may be further configured to check whether a number of words contained in the detected subframe is a predefined number, and performing a parity check for each word to identify a start point of a subframe, wherein the predefined number of words contained in a subframe is 10 words.

In one or more embodiments, the processing unit may be further configured to detect a second subframe adjacent to the first detected subframe, and to identify a time difference between the two adjacent subframes to identify a start point of a subframe. In one or more embodiments, the processing unit may be further configured to check whether a time difference between the two adjacent subframes is a predefined time period to identify a time difference between the two adjacent subframes, wherein the predefined time period is 6 seconds.

In one or more embodiments, the processing unit may be further configured to identify a time difference between truncated TOW in TLM words of the two adjacent subframes to identify a time difference between the two adjacent subframes.

In one or more embodiments, the processing unit may be further configured to check whether a time difference between truncated TOW in TLM words of the two adjacent subframes is a predefined time period to identify a time difference between the two adjacent subframes, wherein the predefined time period is 6 seconds.

In one or more embodiments, the processing unit may be further configured to retrospectively reprocess the stored satellite signals.

In one or more embodiments, the processing unit may be further configured to retrospectively reprocess raw complex data samples demodulated from the received satellite signals, e.g. to accumulate the raw complex data samples for each data bit to retrospectively reprocess the raw complex data samples, e.g. to accumulate twenty millisecond complex data samples for each data bit to retrospectively reprocess the raw complex data samples.

In one or more embodiments, the processing unit may be further configured to recover a portion of the satellite data stream comprises recovering a portion of the satellite data stream from raw complex data samples stored based on the received satellite signals prior to completing bit synchronization and subframe synchronization.

In one or more embodiments, the processing unit may be further configured to publish the portion of the satellite data stream, e.g. to publish at least one subframe of the satellite data stream upon completing subframe synchronization.

In one or more embodiments, the processing unit may be further configured to publish the at least one subframe upon identifying a start point of a subframe of the satellite data stream.

In one or more embodiments, the processing unit may be further configured to publish at least one subframe upon detecting two successive preamble sequences in the satellite data stream.

In one or more embodiments, the processing unit may be further configured to publish at least one subframe upon completing subframe synchronization after a start point of a second subframe in the five-subframe data sequence. The processing unit may be further configured to publish at least two subframes upon completing subframe synchronization after a start point of a third subframe in the five-subframe data sequence. The processing unit may be further configured to publish at least three subframes upon completing subframe synchronization after a start point of a fourth subframe in the five-subframe data sequence.

In one or more embodiments, the device for collecting a satellite data stream may be implemented within a transceiving device, which can be a GPS navigation device.

According to another aspect of the present disclosure, a device for collecting a satellite data stream is disclosed. The device includes: a receiving means for receiving satellite signals; a storing means for storing the received satellite signals; and a processing means for completing bit synchronization and subframe synchronization of the received satellite signals, and recovering a portion of the satellite data stream from the satellite signals stored in the storing unit prior to completing bit synchronization and subframe synchronization.

According to another aspect of the present disclosure, a method for reducing an amount of time to collect clock and ephemeris data by a device is disclosed. The method includes: acquiring a plurality of satellites; receiving a signal from each satellite; storing complex I and Q data samples for each satellite separately; determining a millisecond containing a data bit edge in the signal from each satellite; performing subframe synchronization for each satellite based on the determined data bit edge; and assembling subframe data from the complex I and Q data associated with the signal from each satellite.

According to another aspect of the present disclosure, a device for reducing an amount of time to collect clock and ephemeris data is disclosed. The device includes: a processor configured to acquire a plurality of satellites; a receiver configured to receive a signal from each satellite; a memory configured to store complex I and Q data samples for each satellite separately; wherein the processor is further configured to perform subframe synchronization for the signal from each satellite, and to assemble subframe data from the complex I and Q data associated with the signal from each satellite.

According to an embodiment, there is a method for collecting Clock and Ephemeris data by a receiver, the method including: collecting and retrospectively demodulating data bits prior to completing bit synchronization and subframe synchronization; storing raw complex data samples received prior to completing bit synchronization and subframe synchronization; retrospectively reprocessing the raw complex data samples; and recovering a portion of a satellite data stream prior to determining a data bit edge and prior to determining a start of subframe points.

According to embodiments, the method can also include receiving data from one or more satellites which are part of a GNSS. The method can also include allocating a separate memory buffer for each satellite.

According to another embodiment, there is a receiver for collecting Clock and Ephemeris data, the receiver including: a processor configured to collect and retrospectively demodulate data bits prior to completing bit synchronization and subframe synchronization; a memory configured to store raw complex data samples received prior to completing bit synchronization and subframe synchronization; the process configured to retrospectively reprocess the raw complex data samples; and the processor configured to recover a portion of a satellite data stream prior to determining a data bit edge and prior to determining a start of subframe points.

According to embodiments, the receiver can also include a transceiver configured to receive data from one or more satellites which are part of a GNSS. The device can also include a separate memory buffer allocated for each satellite.

According to an embodiment, there is a method for reducing the amount of time to collect Clock and Ephemeris data by a device, the method including: acquiring a plurality of satellites; receiving a signal from each satellite; storing complex I and Q data samples for each satellite separately; determining the millisecond containing a data bit edge from the signal from each satellite; performing subframe synchronization for the signal from each satellite; and assembling subframe data from the complex I and Q data associated with the signal from each satellite.

According to another embodiment, there is a device for reducing the amount of time to collect Clock and Ephemeris data, the device including: a processor configured to acquire a plurality of satellites; a transceiver configured to receive a signal from each satellite; a memory configured to store complex I and Q data samples for each satellite separately; the processor configured to perform subframe synchronization for the signal from each satellite; and the processor configured to assemble subframe data from the complex I and Q data associated with the signal from each satellite.

BRIEF DESCRIPTION OF THE DRAWINGS

The accompanying drawings illustrate exemplary embodiments, wherein.

DETAILED DESCRIPTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Furthermore, the terms "ephemeris data" and "Clock and Ephemeris data" and "Ephemeris and Clock data" refer to Clock and Ephemeris data and are considered to be equivalent terms.

Figure 1:
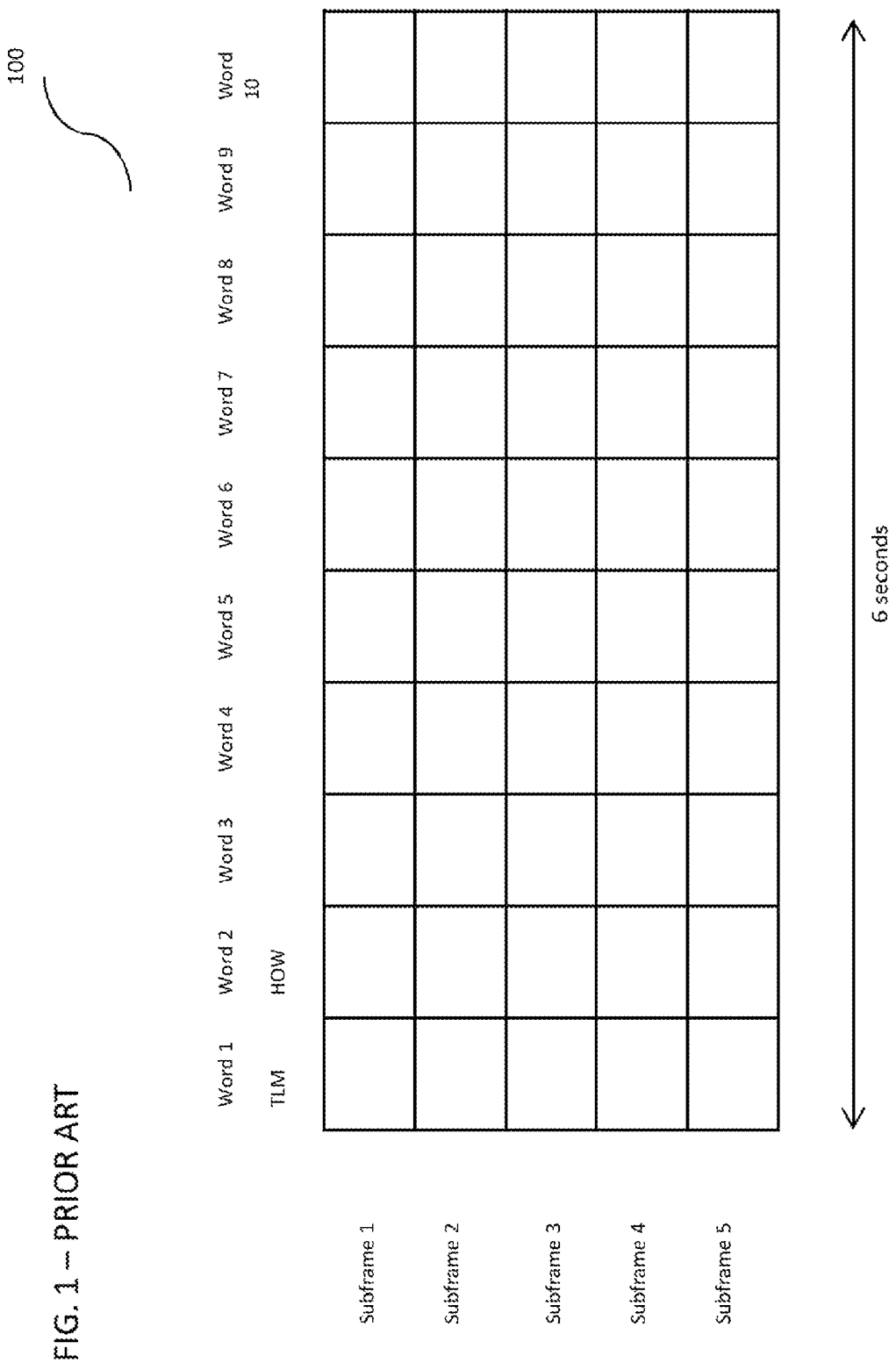
FIG. 1 illustrates a five subframe GPS data structure.
Figure 2:
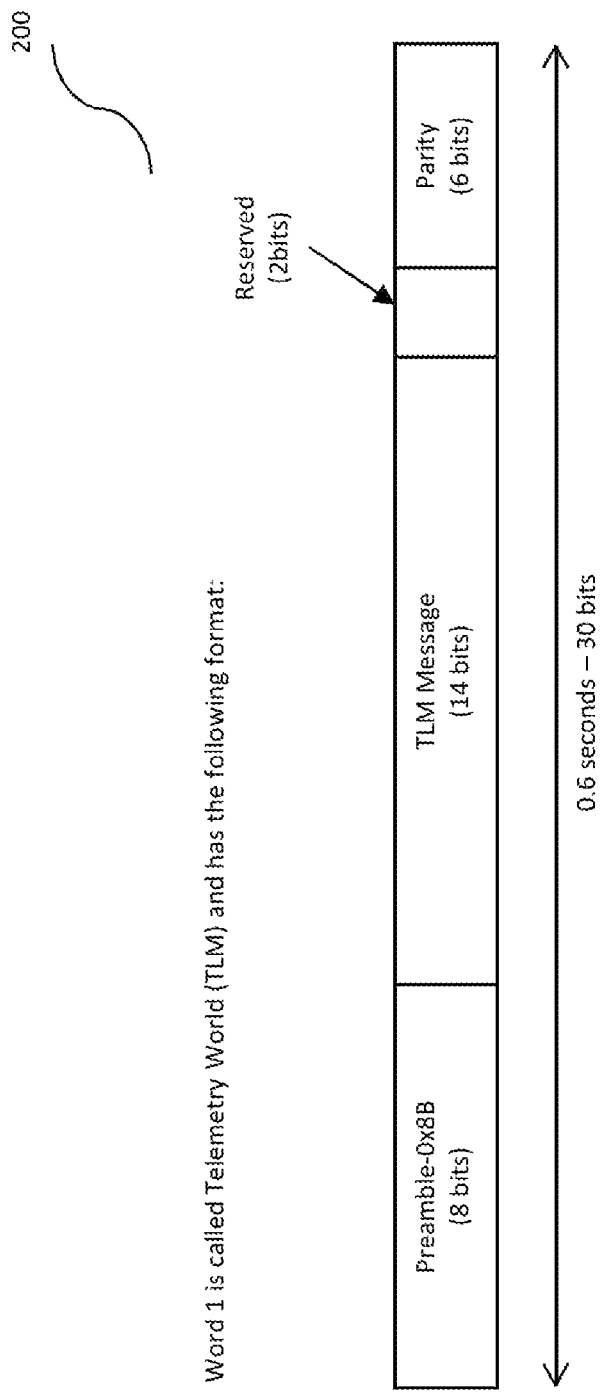
FIG. 2 shows a Telemetry word.
Figure 3:
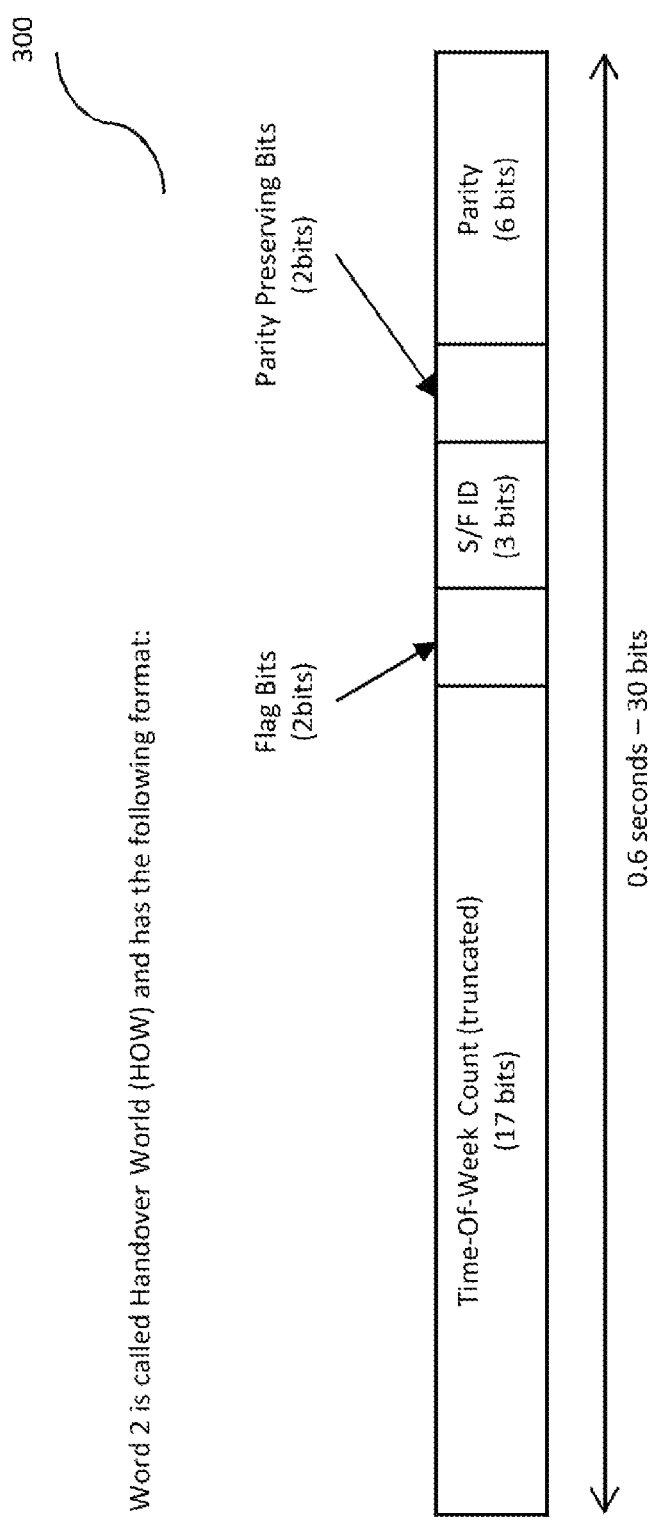
FIG. 3 shows a Handover word.
Figure 5:
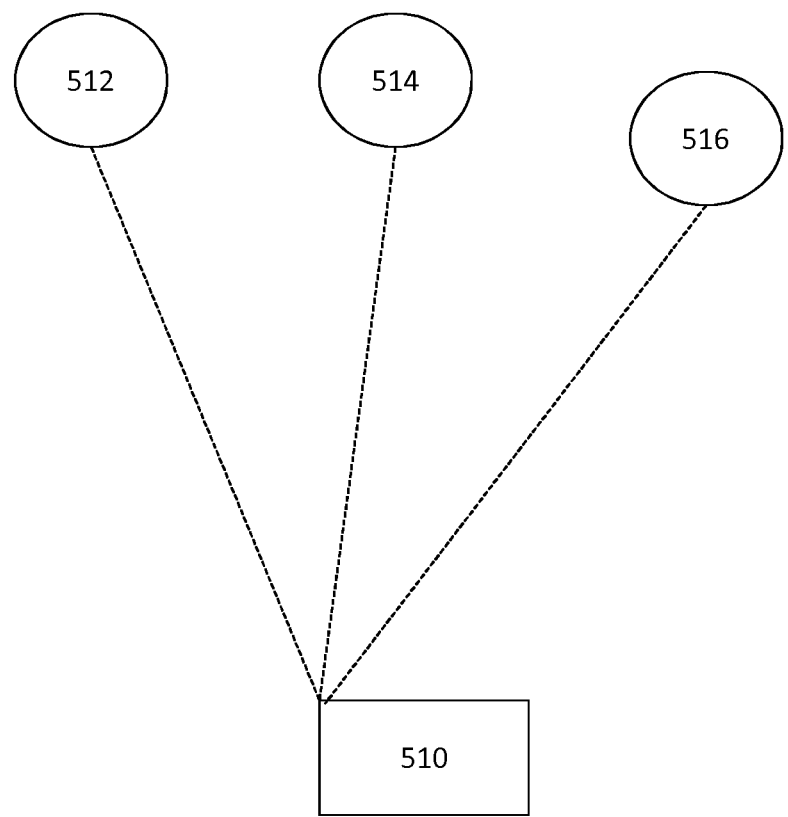
FIG. 5 depicts a receiver and a plurality of satellites according to an embodiment.

As described in the Background, it may be desirable to reduce the amount of time to collect Clock and Ephemeris data. Prior to discussing specific embodiments, an environment in which these embodiments can operate is now discussed with respect to FIG. 5. FIG. 5 includes a receiver 510 which is receiving signals from a plurality of satellites 512, 514 and 516, e.g., Global Positioning System (GPS) satellites. These signals include the five subframe GPS data structure 100 previously described and shown in FIG. 1.

Although applicable to all Global Navigation Satellite System GNSS (including, but not limited to, GPS, GLONASS, Galileo and Beidou) systems, embodiments described herein are described with respect to GPS for reasons of clarity and simplicity. It is to be understood that these embodiments can be applied to other GNSS systems.

Figure 6:
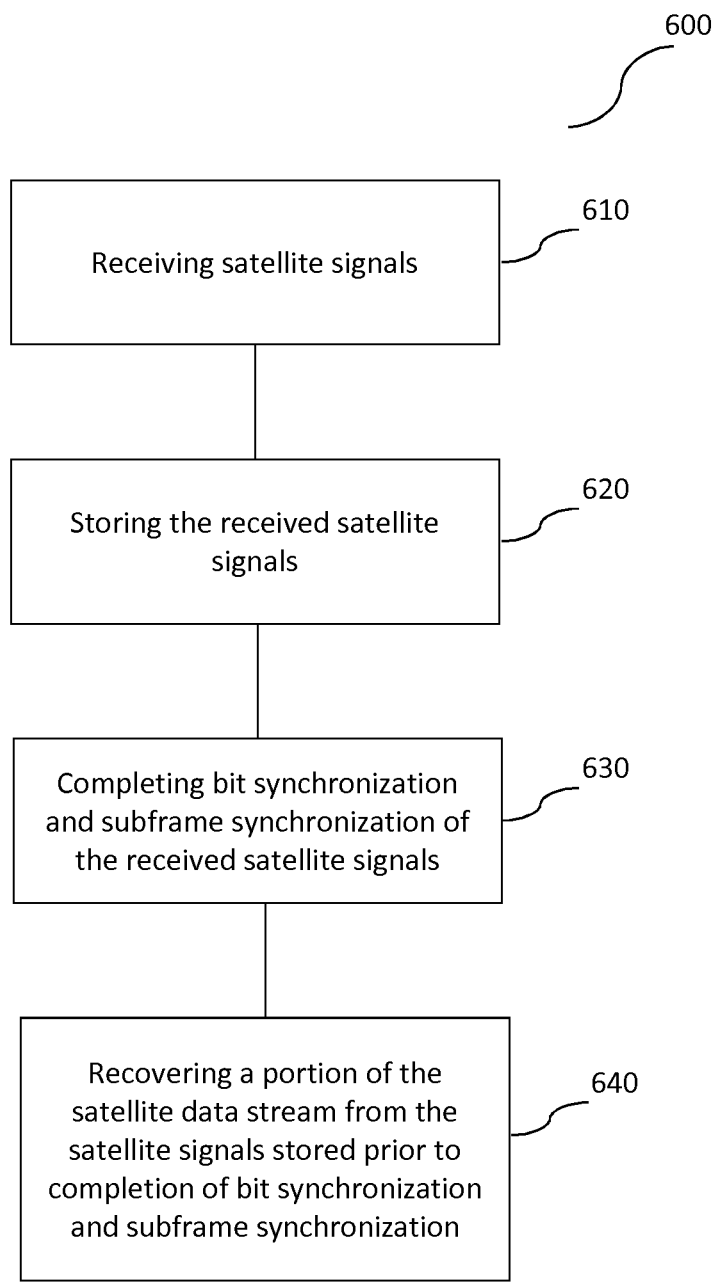
FIG. 6 shows a method of collecting a satellite data stream according to an embodiment.

FIG. 6 shows a method 600 for collecting a satellite data stream, e.g. for collecting Clock and Ephemeris data. The method includes receiving satellite signals (in 610), e.g. receiving satellite signals by a receiver from a plurality of satellites.

The method 600 further includes storing the received satellite signals (in 620), e.g. storing the received satellite signals from a plurality of satellites in a plurality of buffer memories separately, i.e. the satellite signals from the same satellite are typically stored in the same buffer memory. According to an embodiment, storing the received satellite signals may include storing raw complex data samples based on the received satellite signals, wherein the raw complex data is demodulated from the received satellite signals. In some embodiments, the raw complex data may be complex I and Q data samples. According to a further embodiment, storing the received satellite signals may include storing the received satellite signals prior to completing bit synchronization and subframe synchronization.

The method 600 further includes completing bit synchronization and subframe synchronization of the received satellite signals (in 630). According to an embodiment, the completion of bit synchronization may be achieved by a detection of a data bit edge, e.g. by a detection of a millisecond containing a data bit edge from the received satellite signals. As discussed above, detection of a data bit edge typically occurs during a transition from a one to a zero or from a zero to a one. Depending upon signal strength and transition frequency, this process may be sufficient long to allow for significant quantities of data to be stored.

According to an embodiment, the completion of subframe synchronization may be achieved by identifying a start point of a subframe. In one or more embodiments, a start point of a subframe can be identified by performing the following checkings: (1) Subframes must start with the 0x8B preamble sequence; (2) Subframes must contain 10 words, all of which pass the parity check; and (3) Two adjacent Subframes must be found and the difference between the truncated Time_of_Week (TOW) in the two TLM words must differ by six seconds. If all the above 3-check pass, a start point of the subframe can be determined. Likewise this process can be time-consuming, with the result that significant quantities of data are stored during subframe synchronization.

The method 600 further includes recovering a portion of the satellite data stream from the satellite signals stored prior to completing bit synchronization and subframe synchronization (in 640), e.g. recovering at least one subframe of the 5-subframe data sequence based on the complex raw data samples stored prior to completing bit synchronization and subframe synchronization. According to an embodiment, the raw complex data samples such as those stored during bit synchronization and subframe synchronization may be retrospectively reprocessed to recover a portion of the data stream. According to a further embodiment, retrospectively reprocessing the raw complex data samples includes accumulating twenty millisecond complex data samples for each data bit of the satellite data stream.

According to an embodiment, the method 600 further includes publishing at least one subframe of the satellite data stream (not shown in FIG. 6), e.g. publishing at least one subframe upon completing subframe synchronization after a start point of a second subframe in the five-subframe data sequence, e.g. publishing at least two subframes upon completing subframe synchronization after a start point of a third subframe in the five-subframe data sequence, e.g. publishing at least three subframes upon completing subframe synchronization after a start point of a fourth subframe in the five-subframe data sequence.

According to embodiments, a method for reducing the amount of time to collect Clock and Ephemeris data is to collect and retrospectively demodulate the data bits prior to the point in time that bit synchronization and subframe synchronization were achieved. This is made possible by storing in a memory buffer, the raw complex data samples received before bit synchronization and subframe synchronization were achieved. The receiver can then retrospectively reprocess the buffered memory complex data samples and by working backwards in time from the point that subframe data was achieved, recover the satellite data stream. Hence data bits can be recovered from a time before the data bit edge and start of subframe points were determined. This means that the time taken to achieve bit synchronization is not wasted and that data can be recovered from this period of time, where relevant data is recovered as a result of this process, satellite data acquisition and processing time can be reduced.

According to an embodiment, memory buffers for each satellite are allocated independently. Once satellite acquisition is achieved, complex I and Q data samples are stored in the memory buffers in parallel, to determine the millisecond containing the data bit edge. Subframe synchronization can be performed in the same manner as is currently done. Once subframe synchronization is completed, the complex I and Q data samples in the memory buffers can be accumulated into data bits and used to assemble subframe data. Hence, subframes of data can be recovered prior to the point at which bit synchronization and subframe synchronization was obtained thus increasing the amount of satellite data collected at this point in time.

Figure 7:
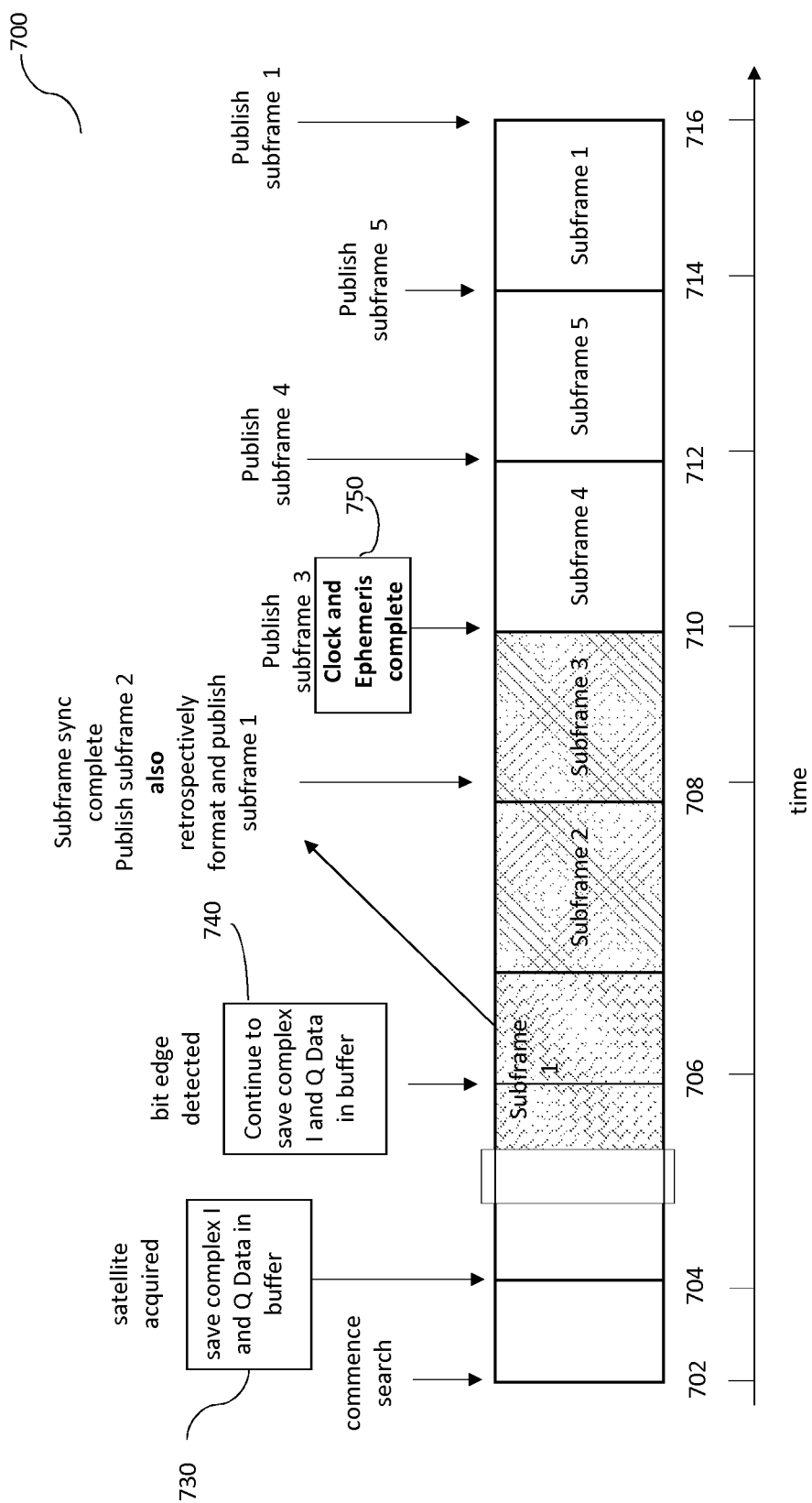
FIG. 7 illustrates an timeline of satellite acquisition and Ephemeris collection according to an embodiment.

An example of an exemplary timeline 700 is shown in FIG. 7. In time point 702, a satellite searching commences, e.g. when a GPS receiver is in a Cold Start condition. Once satellite acquisition is achieved in 704, complex I and Q data samples are continuously saved in buffers, and in parallel time a bit edge detection is performed. In time point 706, complex I and Q data samples are continuously being saved and a bit edge is successfully detected, i.e. a bit synchronization is achieved. In one or more embodiments, a bit synchronization is achieved mid-way through subframe 1, which is the case illustrated in FIG. 7, then the subframe synchronization can be completed earliest after a start point of subframe 3 (which is illustrated as time point 708). I.e. the first complete received subframe is subframe 2, and the stored complex I and Q data are retrospectively formatted. So subframe 1, as well as subframe 2, are published at the same time. Then with the successive publishing of subframe 3, the Clock and Ephemeris data is collected completely.

Figure 4:
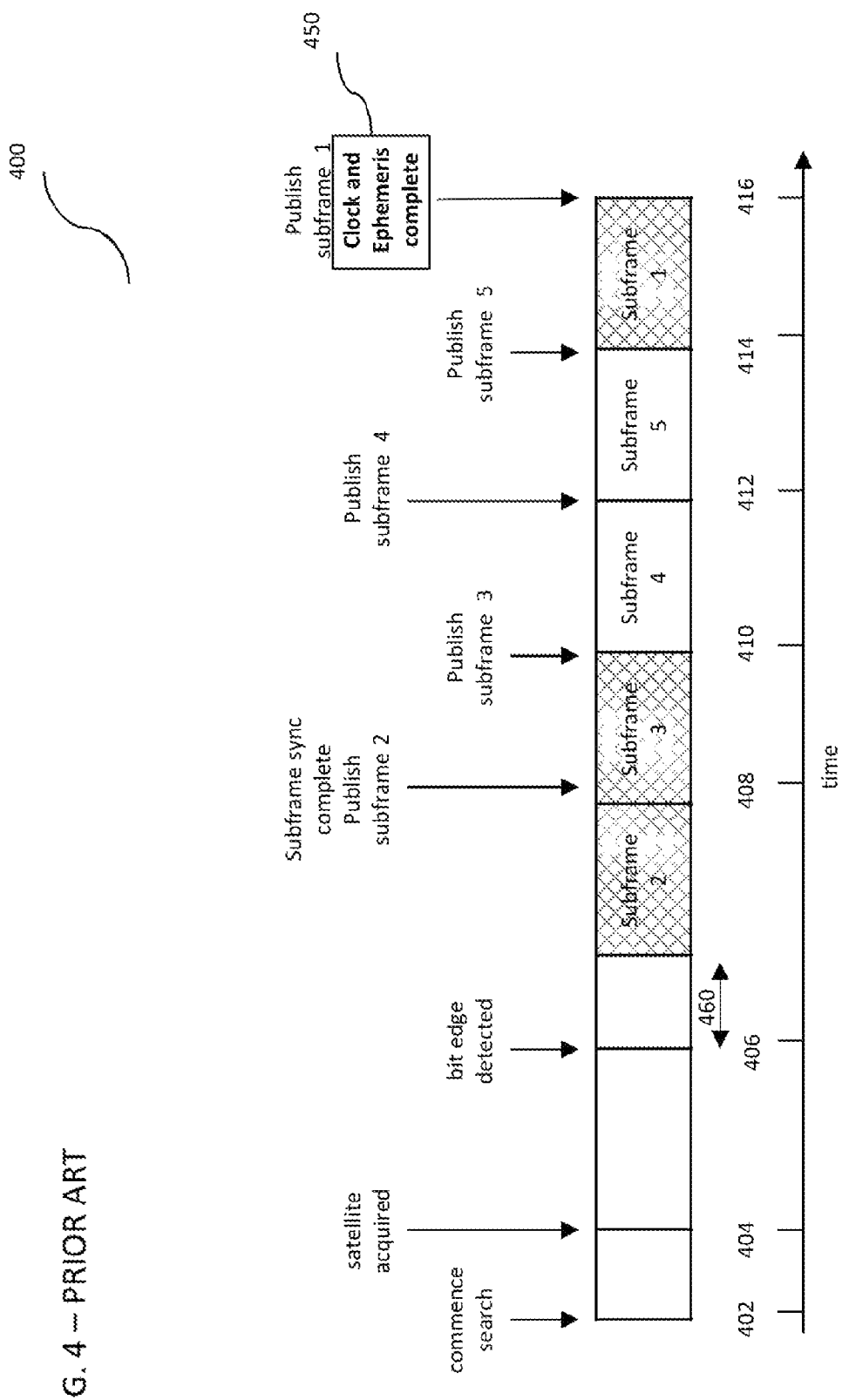
FIG. 4 shows a conventional timeline of satellite acquisition and Ephemeris collection.

This exemplary timeline 700 includes the additional steps of save complex I and Q data in a memory buffer as shown in block 730 and to continue to save complex I and Q data in the memory buffer as shown in block 740. Additionally, the completion of the Ephemeris 750 occurs, in this example, when subframe three is published. Comparing this exemplary timeline 700 to the conventional timeline 400 shown in FIG. 4, the completion of the Ephemeris 750 as compared to conventional completion of the Ephemeris 450 occurs 18 seconds earlier (i.e., three subframes earlier).

According to an embodiment, only the last eight words of the subframe recovered from the memory buffer are required to be actually contained within the buffer. The first two words, the Telemetry (TLM) word and the Handover Word (HOW), contain no satellite specific information and are able to be accurately predicted by the GNSS receiver software program.

According to an embodiment, Ephemeris collection time can be reduced by an integer multiple of six seconds. Embodiments can reduce the average, the 95% and the maximum Clock and Ephemeris collection times. There will be a corresponding reduction in the receivers Time-To-First-Fix (TTFF), which is a criteria used by potential customers when selecting a GNSS supplier.

According to an embodiment the total time taken can be decreased to a maximum of 35.2 seconds, and will in general reduce the average time to collect Ephemeris and Clock data by between four and eight seconds, depending on the received signal strength Embodiments can also be relevant and beneficial in Cold Start situations where there is no prior knowledge of time or satellite or user position by a receiver. Additionally, embodiments can reduce the time to collect Clock and Ephemeris data, and consequently the time taken to generate the first position and time solution. This is another criteria used by potential customers in selecting a specific GNSS solution from the marketplace.

Figure 8:
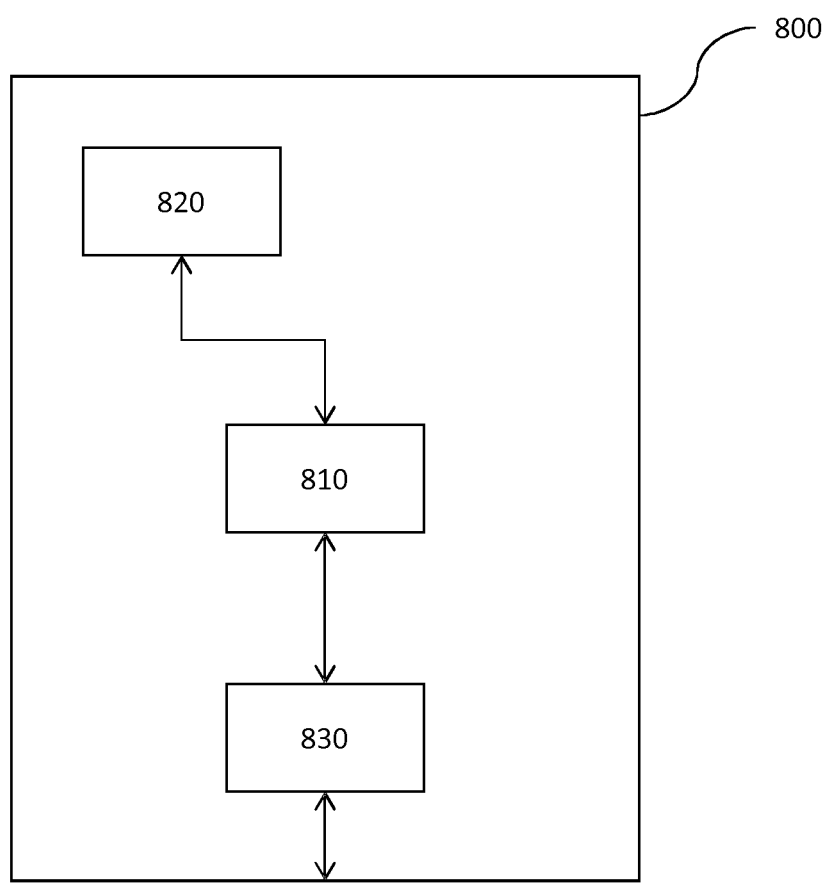
FIG. 8 depicts a device according to an embodiment.

The embodiments described above provide for a general reduction in the average time to collect Ephemeris and Clock data. An exemplary device 800, e.g., a receiving device, in which the above described embodiments can be performed, is shown in FIG. 8. Therein one or more processing units 810 operate to perform operations, e.g., by executing software code in support of the above described embodiment, which can be stored in one or more storing units 820. The device 800 can also include a receiving unit 830 which enables the device to communicate as desired, e.g., to receive signals from satellites. According to an embodiment, the device 800 may be implemented within a transceiving device, e.g. a GPS navigation device.

The above-described exemplary embodiments are intended to be illustrative in all respects, rather than restrictive, of the present invention. Thus the present invention is capable of many variations in detailed implementation that can be derived from the description contained herein by a person skilled in the art. No element, act, or instruction used in the description of the present application should be construed as critical or essential to the invention unless explicitly described as such.

ACRONYMS/ABBREVIATIONS

GNSS—Global Navigation Satellite System
GPS—Global Positioning System
TLM—Telemetry
HOW—Handover Word
TTFF—Time To First Fix
TOW—Time Of Week

What is claimed is:

1. A method for collecting a satellite data stream comprising a plurality of subframes, the method comprising:
   receiving satellite signals;
   storing the received satellite signals;
   synchronizing bit and subframe data of the received satellite signals after a start point of a first subframe of the plurality of subframes;
   during or after the synchronizing of the bit and subframe data, recovering a portion of the satellite data stream from the satellite signals stored prior to the start point of the first subframe of the plurality of subframes; and
   publishing the recovered portion of the satellite data stream before the first subframe of the plurality of subframes is repeated.

2. The method of claim 1, wherein the satellite data stream includes at least clock and ephemeris data.

3. The method of claim 2, wherein the satellite data stream comprises a five-subframe data, and the at least clock and ephemeris data is contained in the first three subframes of the five-subframe data.

4. The method of claim 1, wherein receiving satellite signals comprises receiving the satellite signals from one or more satellites of one or more of GPS, GLONASS, Galileo, and Beidou systems.

5. The method of claim 4, wherein the satellite signals received from the one or more satellites are stored separately.

6. The method of claim 1, wherein storing the received satellite signals comprises storing raw complex data samples based on the received satellite signals.

7. The method of claim 1, wherein synchronizing bit and subframe data comprises a determination of a data bit edge from the received satellite signals.

8. The method of claim 1, wherein synchronizing bit and subframe data comprises identifying a start point of a subframe.

9. The method of claim 8, wherein identifying a start point of a subframe comprises:
   detecting a predefined preamble of a first subframe;
   determining a number of words contained in the detected first subframe, and
   performing parity check for each word; and
   detecting a second subframe adjacent to the detected first subframe, and
   identifying a time difference between the two adjacent subframes.

10. The method of claim 1, further comprises retrospectively reprocessing raw complex data samples demodulated from the received satellite signals.

11. The method of claim 10, wherein retrospectively reprocessing the raw complex data samples comprises accumulating the raw complex data samples for each data bit.

12. The method of claim 1, wherein recovering the portion of the satellite data stream comprises recovering a portion of the satellite data stream from raw complex data samples stored based on the received satellite signals prior to completing bit synchronization and subframe synchronization.

13. The method of claim 3, further comprises publishing at least one subframe upon completing subframe synchronization after a start point of a second subframe in the five-subframe data.

14. A device for collecting a satellite data stream comprising a plurality of subframes, the device comprising:
   a receiving unit configured to receive satellite signals;
   a storing unit configured to store the received satellite signals; and
   a processing unit configured to synchronize bit and subframe data of the received satellite signals after a start point of a first subframe of the plurality of subframes, and to recover a portion of the satellite data stream from the satellite signals stored prior to the start point of the first subframe of the plurality of subframes where the recovering of the portion of the satellite data stream occurs during or after the synchronizing of the bit and subframe data; wherein the processing unit is further configured to publish a recovered portion of the satellite data stream before the first subframe of the plurality of subframes is repeated.

15. The device of claim 14, wherein the receiving unit is configured to receive the satellite signals from one or more satellites of GPS, GLONASS, Galileo, Beidou systems.

16. The device of claim 15, wherein the storing unit comprises multiple buffer storing units configured to store the satellite signals received from the one or more satellites separately.

17. The device of claim 14, wherein the processing unit is further configured to publish at least one subframe upon completing subframe synchronization after a start point of a second subframe in the five-subframe data.

18. The device of claim 14 is implemented within a transceiving device.

19. The device of claim 18, wherein the transceiving device is a GPS navigation device.

20. A method for reducing an amount of time to collect clock and ephemeris data by a device, wherein the data comprises a plurality of subframes, the method including:
   acquiring a plurality of satellites;
   receiving a signal from each satellite;
   storing complex I and Q data samples for each satellite separately;
   determining a millisecond containing a data bit edge in the signal after a start point of a first subframe of the plurality of subframes from at least one satellite;
   performing subframe synchronization for each satellite based on the determined data bit edge; and
   during or after the subframe synchronization, recovering subframe data from the complex I and Q data associated with the signal from the at least one satellite prior to the start point of the first subframe of the plurality of subframes; and
   publishing the recovered data from the complex I and Q data at the same time as or before the publishing of a third subframe of the plurality of subframes.

21. A device for reducing an amount of time to collect clock and ephemeris data, wherein the data comprises a plurality of subframes, the device including:
   a processor configured to acquire a plurality of satellites;
   a receiver configured to receive a signal from each satellite;
   a memory configured to store complex I and Q data samples for each satellite separately;
   wherein the processor is further configured to perform subframe synchronization for the signal after a start point of a first subframe of the plurality of subframes from each satellite, and to recover subframe data from the complex I and Q data associated with the signal from the at least one satellite prior to the start point of the first subframe of the plurality of subframes where the recovering of the portion of the subframe data occurs during or after the subframe synchronization;
   and wherein the processor is further configured to publish the recovered data from the complex I and Q data at the same time as or before the publishing of a third subframe of the plurality of subframes.

* * * * *